Aug. 31, 1965    E. C. ELSNER    3,203,067
WEBBING-FITTING ASSEMBLY
Filed Jan. 22, 1963
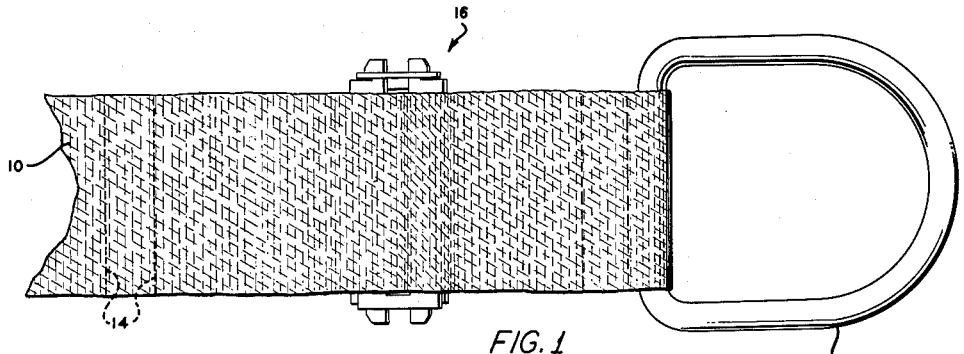
FIG. 1
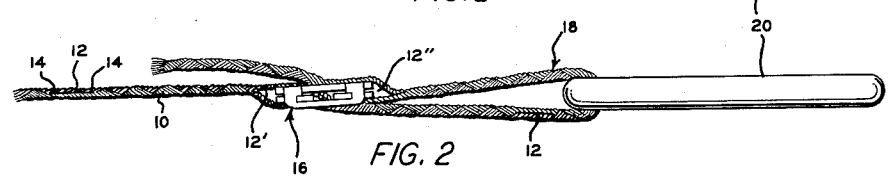
FIG. 2
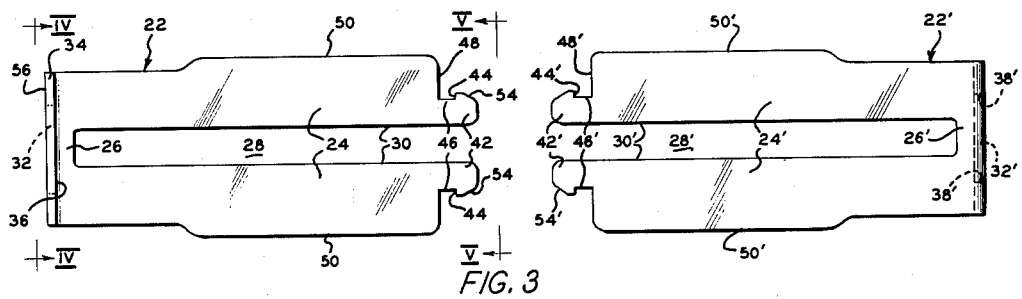
FIG. 3
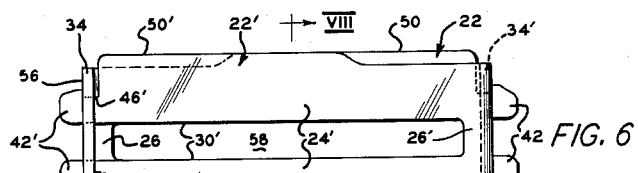
FIG. 6
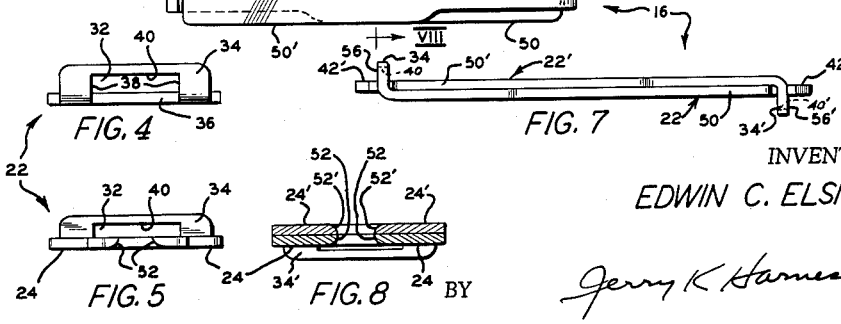
FIG. 4    FIG. 7
FIG. 5    FIG. 8
INVENTOR
EDWIN C. ELSNER
BY Jerry K. Harness
his ATTORNEY 3,203,067
WEBBING-FITTING ASSEMBLY
Edwin C. Elsner, Glendale, Calif., assignor to Aeroquip Corporation, Jackson, Mich.
Filed Jan. 22, 1963, Ser. No. 253,132
9 Claims. (Cl. 24—265)

The invention pertains to a webbing fitting assembly and particularly pertains to a webbing fitting which may be employed with webbing to prevent the necessity for sewing to define loops with the webbing.

Flexible tension members in the form of straps or webbing are commonly employed in hold-down apparatus, cargo-handling, rigging and other applications requiring a high degree of flexibility, light weight, low cost, and easy handling. With the advent of synthetic fiber webbing, such as nylon webbing, webbing tension members are now being used to transmit high tension forces without failure. However, in that the webbing usually employs an end fitting upon the end or ends thereof, the usual means of connection of the end fitting to the webbing usually constitutes the "weak link" of the tension member assembly.

The most common means for attaching a buckle, D-ring, clip, or other end fitting to the end of webbing or a web strap consists of forming a loop with the end of the webbing to receive the end fitting. The free end of the webbing is folded back upon the primary webbing portion and sewn thereto to maintain a closed loop. Under high tensile stresses the failure usually occurs at the sewn connection.

The invention pertains to a novel webbing and clip combination which eliminates the necessity for sewing and increases the strength of webbing tension systems. The invention, is particularly adaptable for use with so-called "slotted" webbing. Slotted webbing is a webbing weave wherein the web fibers are so woven that transversely defined slots or openings are formed in the webbing at predetermined intervals along the length of the webbing. Such slots will normally be located at equally-spaced locations along the webbing length, and are open at each end. The ends of the slots usually coincide with the longitudinal edges of the webbing. As the slot is defined in the webbing by the weaving process, no sewing or foreign means are required in the formation of this type of webbing.

The basic object of the invention is to provide a novel webbing and fitting combination of the type described wherein sewing operations are completely eliminated and the tensile strength of the webbing is not adversely effected by the connection produced by the invention.

Another object of the invention is to provide a webbing fitting which may be constructed from sheet material by economical stamping and bending operations.

Yet a further object of the invention is to provide a two-piece webbing fitting wherein the components of the fitting may be readily assembled in a positive manner and where accidental disassembly of the fitting is prevented.

An additional object of the invention is to provide a two-piece webbing fitting which may be easily assembled and disassembled without special tools or equipment, and wherein the assembly is such that the resistance to deformation under tension forces is greatly increased due to the assembled relationship, with respect to the resistance to deformation of a single component in the unassembled relationship.

These and other objects of the invention arising from the details and relationship of the components of an embodiment thereof will be apparent from the following description and accompanying drawings wherein:

FIG. 1 is an elevational view of a webbing, clip fitting, and end fitting in a typical assembled relationship, FIG. 2 is a plan view of the assembly of FIG. 1, FIG. 3 is an elevational view of the two components of the clip fitting in accord with the invention illustrating the relationship of the clips prior to assembling them in the superimposed relationship, FIG. 4 is an end view of a component of the clip as taken along section IV—IV of FIG. 3, FIG. 5 is an end view of a clip component taken along section V—V of FIG. 3, FIG. 6 is an elevational view illustrating the clip components in the fully assembled relationship, the webbing not being shown for purposes of illustration, FIG. 7 is a plan view of the assembly of FIG. 6, and FIG. 8 is a sectional view of the assembly of FIG. 6 taken along section VIII—VIII thereof.

The webbing fitting in accord with the invention may be designated a clip and its purpose, as set forth above, to interconnect spaced portions of webbing or a strap to form a loop, will be appreciated from FIGS. 1 and 2 of the drawing.

The webbing or strap 10 is preferably of a "slotted" type and may be woven of nylon filaments to produce a tension element of very high strength. The webbing 10 is so woven that a plurality of transversely disposed slots 12 is formed in the webbing. As the longitudinal edges 14 of the slots 12, as illustrated by the dotted lines of FIG. 1, are defined by the fibers of the webbing itself during the weaving of the webbing, the formation of the slots does not materially affect the tensile strength of the webbing. The slots 12 intersect the longitudinal edges of the webbing, as will be apparent from FIG. 2. The slots 12 will normally be "closed," as shown in FIG. 2. However, the slots may be opened by grasping the webbing on the opposite sides of a slot and compressing the webbing whereby the webbing forming the sides of the slot will "buckle" in opposite directions and "open" the slot.

The clip fitting 16 constitutes a type of clevis which is associated with two webbing slots, thereby interconnecting spaced portions of the webbing to form a loop. As will be apparent from FIGS. 1 and 2, the clip is associated with slots 12' and 12" which are so spaced as to form a loop 18 for receiving the D-ring end fitting 20. The clip 16 thus functions as a fastening member to maintain the loop 18 and permit the D-ring to be attached to the webbing without requiring sewing or similar conventional fastening procedures.

The webbing fitting 16, in accord with the invention, consists of two identical components or members 22 and 22', and references to features of members 22 also apply to 22' and are designated by primes. The members 22 are preferably formed of steel sheet material and may be formed by a stamping operation. The members each include a pair of longitudinal fingers 24 disposed in spaced, parallel relationship. The fingers 24 are interconnected at one end by the member portion 26, and are free at the other end, whereby an open-ended slot 28 will be defined by the inner finger edges 30 closed at one end by the member portion 26.

A rectangular opening 32 is defined in the member portion 26 during the stamping operation, and the end portion 34 of the member portion is bent at substantially right angles to the general plane of the member 22 along a line substantially constituting an extension of the opening edge 36, and constitutes a clip-locking means. The bending of the member portion 26 in this manner forms portion 34 as a bridge of inverted U-configuration, FIG. 4. As the opening 32 is now substantially defined in the bridge portion 34, the opening may be considered as transversely related to the general plane of the associated member 22, and includes opposed, spaced edges 38, and an edge 40 spaced from and substantially parallel to the general plane of the member portion 26. It will be noted that the opening 32 is symmetrically related to the associated slot 28.

The free ends of the fingers 24 are also provided with locking means which include hook elements 42 which face outwardly, or away from the associated slot 28, and include a "hooking" surface 44 transversely disposed to the length of the slot.

The free end of the fingers also includes abutment surfaces 46 which are disposed substantially parallel to the slot and face outwardly or away from each other. In the construction of the members 22, the distance between the surfaces 46 of a common member is preferably equal to the distance between the opening edges 38. Also, the thickness of the sheet stock employed in the manufacture of the members 22 will be slightly less, .015 inch, for instance, than the distance from the opening edge 40 to the member portion 26 surface nearest thereto. It will also be appreciated that a surface 48 is defined upon the free ends of the fingers 24 axially spaced from and opposed to the hook element surfaces 44. The distance between the hook element surface 44 and the opposed surface 48 will be slightly greater than the thickness of sheet stock forming the member 22.

To facilitate assembly and disassembly of the webbing fitting 16, the outer edges of the fingers 24 are preferably outwardly set as at 50 adjacent the finger-free ends to form a greater finger width at the free ends than adjacent the member portion 26. As will be appreciated from FIG. 6, this greater finger thickness permits the fingers of a common member 22 to extend beyond the outer finger edges of the other member 22 adjacent the portion 26 thereof when the clip is in the assembled relationship.

To minimize wear and chafing of the webbing, the fingers inner edges may be radiused as at 52, FIGS. 5 and 8, to prevent the webbing from engaging a sharp edge.

As the fingers 24 are of relatively long dimension, as compared with their width, and will usually be constructed of a sheet metal material, .080 inch in thickness, for instance, the operator may deflect the fingers of a common member 22 inwardly, or toward each other, by squeezing the fingers manually or with a pair of pliers by application of force to the edges 50. Such a "squeezing" action will reduce the dimension between the abutment surfaces 46 and hook elements 42.

To assemble the clip to a webbing 10, the operator forms a loop 18 in the webbing whereby two slots 12' and 12" will be in adjacent relation. The operator then inserts the member 22, for instance, in a downward direction, with reference to FIG. 1, whereby one of the fingers 24 will be received within the slot 12' and the other finger will be received within the slot 12". The other member 22' will be so related so the member 22 that the wherein one of its fingers 24' will be received within the slot 12' and the other finger within the slot 12". In inserting the members 22' fingers into the webbing slots, the member 22' will be so related to the member 22 that the bridge portions 34 and 34' of the members will be extending in the direction of the superimposed relationship of the members. Thus, upon relative axial movement of the members 22 and 22' during assembly wherein the fingers 24 and 24' thereof will be in contiguous superimposed relationship, the hook elements thereof will engage the edges 38 and 38' of the openings 34 and 34'. The initial engagement between the free ends of the fingers 24 of one member and the bridge portion of the other member occurs when the beveled surfaces 54 and 54' engage the opening edges 38' and 38, respectively. Thereupon, additional relative axial movement of the members 22 and 22' causes the beveled edges 54 and 54' to bias the fingers of a common member inwardly, and permits the hook elements 42 and 42' to pass through the openings 34' and 34. After the hook elements have completely passed through the openings, the resilient character of the member material will cause the fingers to spring "outwardly," placing the abutment surfaces 46 and 46' in abutting engagement with the opening edges 38' and 38, respectively. At this time the hook element surfaces 44 and 44' will be in opposed relationship to the surfaces 56 and 56' of the bridge portions 34 and 34' which function as a shoulder to prevent withdrawal of the hook elements from the openings.

The above-described relationship will be apparent from FIGS. 3, 6, 7, and 8 wherein the relationship is shown without illustrating the webbing. As noted in FIGS. 3, 6, and 7, the members 22 and 22' are related so that the bridge portion 34 and 34' project in opposite directions, and the member 22' will be placed over the member 22. In the fully assembled relationship, the clip members will be related as illustrated in FIGS. 6 through 8.

As will be appreciated from FIG. 6, the fully assembled relationship between the members 22 and 22' defines a rectangular opening 58 longitudinally defined by the inner finger edges 30 and transversely defined by the member portions 26 and 26'. The webbing slots 12' and 12", thus, each encompass two fingers, one finger of each member, and the clip will thereby positively interconnect two of the webbing slots. As tension forces are applied to the webbing, any tendency for the fingers of a common member to separate is prevented by the engagement of the surfaces 46 and 46' with the opening edges 38' and 38, respectively. The members 22 and 22' cannot be axially withdrawn due to the hook elements wherein surfaces 44 and 44' will engage with surfaces 56' and 56, and surfaces 48 and 48' will engage portions 34' and 34 if the members are moved in the opposite direction. The members 22 and 22' cannot be transversely separated in the direction perpendicular to the general plane of the members due to the fact that the fingers thereof are received between the opening edges 40 and 40' and the member portions 26' and 26. Thus, it will be appreciated that the above-described interconnection of the members 22 provides a webbing clip which will not accidentally disassemble, yet is of highstrength characteristics and may be economically manufactured.

To disassemble the clip fitting, the operator will simultaneously "squeeze" the fingers of both members 22 and 22' to bias the fingers of common members toward each other sufficiently to permit the hook elements 42 and 42' to pass through the openings 34' and 34. Such "squeezing" of the fingers is readily permitted by the use of the outwardly set finger edges 50 and 50' in that the edges 50 and 50' permit the outer finger edges of one member adjacent the hook elements to project beyond the outer edge of the fingers of the other member adjacent the member portion 26 and, therefore, be accessible for squeezing with pliers or between the operator's fingers. The clip fitting 16 may be assembled and disassembled as often as desired in that the assembly and disassembly does not adversely affect the clip components.

It will be appreciated that various modifications to the invention may be apparent to those skilled in the art without departing from the spirit and scope thereof, and it is intended that the invention be defined only by the scope of the following claims.

I claim:

1. A webbing fitting comprising, in combination, first and second interconnectible members, a pair of spaced fingers defined on each of said members resiliently interconnected at one end by a member portion and deflectable toward and away from each other at the other end, there being a slot defined between the fingers of a common member having an open end adjacent said other end of said fingers and closed at the opposite end by said member portion, hook elements defined upon said fingers adjacent said other end thereof, a locking surface defined on said members adjacent said portions thereof and transversely disposed to said fingers adapted to cooperate with the hook elements of the other member fingers to interconnect said members, the slots of said members aligning upon cooperation of said hook elements with said abutment portions wherein an elongated opening is longitudinally defined by said fingers and transversely defined by said member portions, said fingers including first abutment surfaces defined thereon facing away from the associated slot and second abutment surfaces defined upon said members adjacent said portions thereof facing toward the longitudinal axis of the associated slot, said first and second abutment surfaces engaging upon interconnection of said members and preventing separation of the fingers of a common member.

2. A webbing fitting comprising, in combination, first and second interconnectible members, a pair of spaced fingers defined on each of said members resiliently interconnected at one end by a member portion and deflectable toward and away from each other at the other end, there being a slot defined between the fingers of a common member having an open end adjacent said other end of said fingers and closed at the opposite end by said member portion, hook elements defined upon said fingers adjacent said other end thereof, there being an opening defined in said members adjacent said portions thereof and transversely related to said fingers of the associated member adapted to receive the hook elements of the other member fingers, and a locking surface defined on said members adjacent the opening defined therein adapted to cooperate with the hook elements of the other member fingers upon insertion thereof into the opening preventing withdrawal of the said fingers from said opening, the slots of said members aligning upon reception of said hook elements into said openings wherein an elongated opening is longitudinally defined by said fingers and transversely defined by said member portions.

3. A webbing fitting formed of sheet material comprising, in combination, first and second interconnectible substantially planar members, each of said members including a pair of spaced, longitudinal fingers, said fingers being interconnected at one end by a member portion and deflectable toward and away from each other at the other end, there being a slot defined between the fingers of a common member having an opening end adjacent said other end of said fingers and closed at the other end by said member portion, first locking means defined upon each of said fingers, and second locking means defined upon each of said members and extending transversely to the general plane thereof and disposed adjacent said member portions, said first locking means cooperating with said second locking means upon superimposing the fingers of said first member upon those of the second member and wherein the second locking means of each member extends toward the plane of the other member and axially translating said fingers toward said second locking means of the other member, means defined upon said first locking means wherein interlocking of said locking means prevents relative axial and transverse displacement of said members, and wherein an elongated webbing-receiving opening is longitudinally defined by said fingers and transversely defined by said member portions, said first locking means including hook elements extending transversely to the associated fingers and first abutment surfaces facing away from the associated slot, and said second locking means include a shoulder surface transversely related to the fingers of the common member for cooperation with said hook elements of the other member, second abutment surfaces facing toward the slot axis of the associated member for abutting engagement with said first abutment surfaces of the other member preventing separation of the fingers of a common member, and a third abutment surface opposed to and spaced from the general plane of the associated member, the fingers of the other member being interposed between said third abutment surface and the member portion of the associated member.

4. A webbing fitting formed of sheet material comprising, in combination, first and second interconnectible substantially planar members, each of said members including a pair of spaced longitudinal fingers, said fingers being interconnected at one end by a member portion and deflectable toward and away from each other at the other end, there being a slot defined between the fingers of a common member having an open end adjacent said other end of said fingers and closed at the other end by said member portion, first locking means defined upon each of said fingers, and second locking means defined upon each of said members and extending transversely to the general plane thereof and disposed adjacent said member portions, said first locking means cooperating with said second locking means upon superimposing the fingers of said first member upon those of the second member and wherein the second locking means of each member extends toward the plane of the other member and axially translating said fingers toward said second locking means of the other member, means defined upon said first locking means wherein interlocking of said locking means prevents relative axial and transverse displacement of said members, and wherein an elongated webbing-receiving opening is longitudinally defined by said fingers and transversely defined by said member portions, said second locking means including a U-shaped bridge extending from said member portion, said bridge defining an opening having opposed spaced edges transversely disposed to the general plane of the associated member and an edge spaced from and opposed to the associated member portion, said first locking means including hook elements adapted to be inserted into said bridge opening.

5. In a webbing fitting as in claim 4, wherein said bridge is defined by an integral portion of said member transversely depending from said member portion.

6. A webbing fitting formed of sheet material comprising, in combination, first and second interconnectible substantially planar members, each of said members including a pair of spaced, longitudinal fingers, said fingers being interconnected at one end by a member portion and deflectable toward and away from each other at the other end, there being a slot defined between the fingers of a common member having an open end adjacent said other end of said fingers and closed at the other end by said member portion, first locking means defined upon each of said fingers, and second locking means defined upon each of said members and extending transversely to the general plane thereof and disposed adjacent said member portions, said first locking means cooperating with said second locking means upon superimposing the fingers of said first member upon those of the second member and wherein the second locking means of each member extends toward the plane of the other member and axially translating said fingers toward said second locking means of the other member, means defined upon said first locking means wherein interlocking of said locking means prevents relative axial and transverse displacement of said members, and wherein an elongated webbing-receiving opening is longitudinally defined by said fingers and transversely defined by said member portions, the edge of said fingers remote from the edge thereof defining the associated slot includes outwardly extending portions adjacent said first locking means to facilitate deflection of the fingers of a common member toward each other.

7. In combination with a length of webbing having a plurality of uniformly spaced transverse slots defined by the weaving pattern of said webbing, a member having a transverse portion, said length of webbing being looped around said transverse portion thereby providing an upper section of said webbing overlying a lower section of said webbing wherein a slot in said upper section is juxtaposed a slot in said lower section, securing means including a substantially U-shaped member having a pair of parallel, spaced, rigid leg portions interconnected at one end and each having a free end adapted to extend into and through one of said juxtaposed slots to connect said upper and lower sections to thereby close said loop, and means interconnecting the free ends of said leg portions.

8. The subject matter of claim 7 wherein said securing means comprises first and second substantially U-shaped clips having their leg portions extending through said juxtaposed slots and wherein said means interconnecting the free ends of said leg portions are defined on each clip bite portion such that the said leg portions of each clip directly engage and are secured to the bite portion of the other clip.

9. The subject matter of claim 8 wherein said first and second clips are identical.

References Cited by the Examiner

UNITED STATES PATENTS

| | | | |
|---|---|---|---|
| 357,944 | 2/87 | Stout | 24—230.1 |
| 474,521 | 5/92 | Epple | 24—230 |
| 1,100,047 | 6/14 | Batchelder | 24—265 |
| 1,525,694 | 2/25 | Sage et al. | 24—31 |
| 1,526,476 | 2/25 | Hodaly | 2—325 |
| 1,920,876 | 8/33 | Moore | 2—325 |
| 2,411,161 | 11/46 | Jackson | 2—325 |
| 2,923,011 | 2/60 | Findeisen | 2—325 |

FOREIGN PATENTS

| | | |
|---|---|---|
| 762,043 | 10/53 | Germany. |
| 517,957 | 2/40 | Great Britain. |
| 2,742 | 1904 | Great Britain. |

DONLEY J. STOCKING, *Primary Examiner.*